United States Patent
Egan et al.

(10) Patent No.: US 8,386,445 B2
(45) Date of Patent: Feb. 26, 2013

(54) REORGANIZING DATABASE TABLES

(75) Inventors: Randy L. Egan, Rochester, MN (US);
Rafal P. Konik, Oronoco, MN (US);
Roger A. Mittelstadt, Byron, MN (US);
Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 13/105,536

(22) Filed: May 11, 2011

(65) Prior Publication Data
US 2012/0290588 A1 Nov. 15, 2012

(51) Int. Cl.
*G06F 7/00* (2006.01)

(52) U.S. Cl. ........................................ 707/694

(58) Field of Classification Search ............ 707/694, 707/705, 802, 692, 999.1, 999.206
See application file for complete search history.

(56) References Cited

U.S. PATENT DOCUMENTS

| | | | | |
|---|---|---|---|---|
| 5,517,641 | A * | 5/1996 | Barry et al. | 1/1 |
| 8,250,111 | B2 * | 8/2012 | Huras et al. | 707/802 |
| 2010/0223243 | A1 * | 9/2010 | Huras et al. | 707/705 |

* cited by examiner

*Primary Examiner* — Hung T Vy
(74) *Attorney, Agent, or Firm* — Patterson & Sheridan LLP (57) ABSTRACT

Techniques are disclosed for reorganizing rows of a database table. In one embodiment, each row is associated with a respective row identifier. A mapping is provided that assigns a logical identifier to each row identifier. Each database index on the database table is configured to use the logical identifier rather than the row identifier. Accordingly, the rows of the database table may be reorganized without having to modify any database index on the database table.

20 Claims, 6 Drawing Sheets

REORGANIZING DATABASE TABLES

BACKGROUND

Databases are computerized information storage and retrieval systems. The most prevalent type of database is the relational database, a tabular database in which data is defined so that it can be reorganized and accessed in a number of different ways.

Regardless of the particular architecture, in a database management system (DBMS), a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

SUMMARY

Embodiments of the invention provide a computer-implemented method, computer program product and system for performing an operation that includes determining that a condition is met for reorganizing rows of a database table of a database. The database table has a plurality of columns, and the rows occupy a first count of database pages. Each row is uniquely identifiable by a respective row identifier. The database includes a mapping that assigns a logical identifier to each row identifier. The database table is associated with multiple database indexes, each database index associating a different column of the plurality of columns with the logical identifier. The operation also includes reorganizing the rows of the database table upon determining that the condition is met, such that the rows occupy a second count of database pages, the second count being less than the first count. The operation also includes updating the mapping to reflect one or more new row identifiers of the reorganized rows, without requiring any of the databases indexes to be updated.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for reorganizing a database table without having to modify any database indexes on the database table. One embodiment of the invention provides a database management system (DBMS) for a database. The database includes at least one database table having multiple columns and storing rows of data for each column, the rows of data being stored in a first count of database pages. Each row (or physical row) has a respective row identifier assigned by the DBMS. In one embodiment, the DBMS further includes a mapping that assigns a logical identifier to each row identifier. The DBMS is configured to generate database indexes on the database table, based on logical identifiers rather than row identifiers.

In one embodiment, the DBMS may also determine that a predefined condition is met for reorganizing the rows of the database table. The predefined condition includes receiving a request to reorganize the rows of the database table. In other embodiments, the DBMS may be configured to monitor the database table and trigger a reorganization when a predefined condition is met. For instance, the predefined condition may include the database table exceeding a predefined threshold of sparseness. Sparseness refers to an extent to which a database table is sparsely populated, or put another way, an extent to which the database table is not densely populated. For example, a database table may be considered as sparse when the physical rows of the database table are stored in a manner that is not contiguous with other physical rows and/or physically spaced far apart from other physical rows. The database table may be sparse as a result of insert, update, and/or delete operations on the database table. In some embodiments, the DBMS may be configured to delete physical rows merely by marking the physical rows as being deleted. In such embodiments, the physical rows may be deleted more efficiently than an alternative delete operation that includes overwriting deleted physical rows with adjacent or nearby physical rows. The DBMS may also be configured to insert physical rows at the end of the table. Accordingly, the DBMS may insert physical rows more efficiently than by replacing deleted physical rows within the table. Over time, large amounts of unused space may result from the delete and/or insert operations. The large amounts of unused space may increase storage costs and impair performance of the database at least in some cases.

In one embodiment, upon determining that the predefined condition is met, the DBMS reorganizes the rows of the database table to free unused space that is occupied by the database table. The rows of the database table may be reorganized such that the rows are stored in a second count of database pages, the second count being less than the first count. Reorganizing the rows may be visualized as moving the rows to the front of the database table. Because each row identifier specifies a physical location of the row inside the table, a row that is moved to a new location in the database table is assigned a new row identifier in accordance with the new location in the database table. The DBMS updates the mapping to reflect new row identifiers, as rows are moved to new locations inside the database table. Because the database indexes on the database table are generated based on the logical identifiers and not the row identifiers, reorganizing the rows of the database table does not require any of the databases indexes to be modified or rebuilt and does not require exclusive access to the database table. Accordingly, the database table may be reorganized more efficiently, especially in cases where a significant number of databases indexes would otherwise have been modified or rebuilt. Further, the impact of the reorganization on applications accessing the database table may be reduced at least in some cases. In addition, the database table may also be reorganized more frequently, further improving performance of the database and/or the DBMS. For example, the database table may be more frequently reorganized to closely conform to a clustered database index that specifies an order in which the rows of the database table is to be physically stored.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a DBMS may execute in the cloud, where the DBMS is configured to manage one or more databases. Having the DBMS execute in the cloud allows the user to access the databases from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
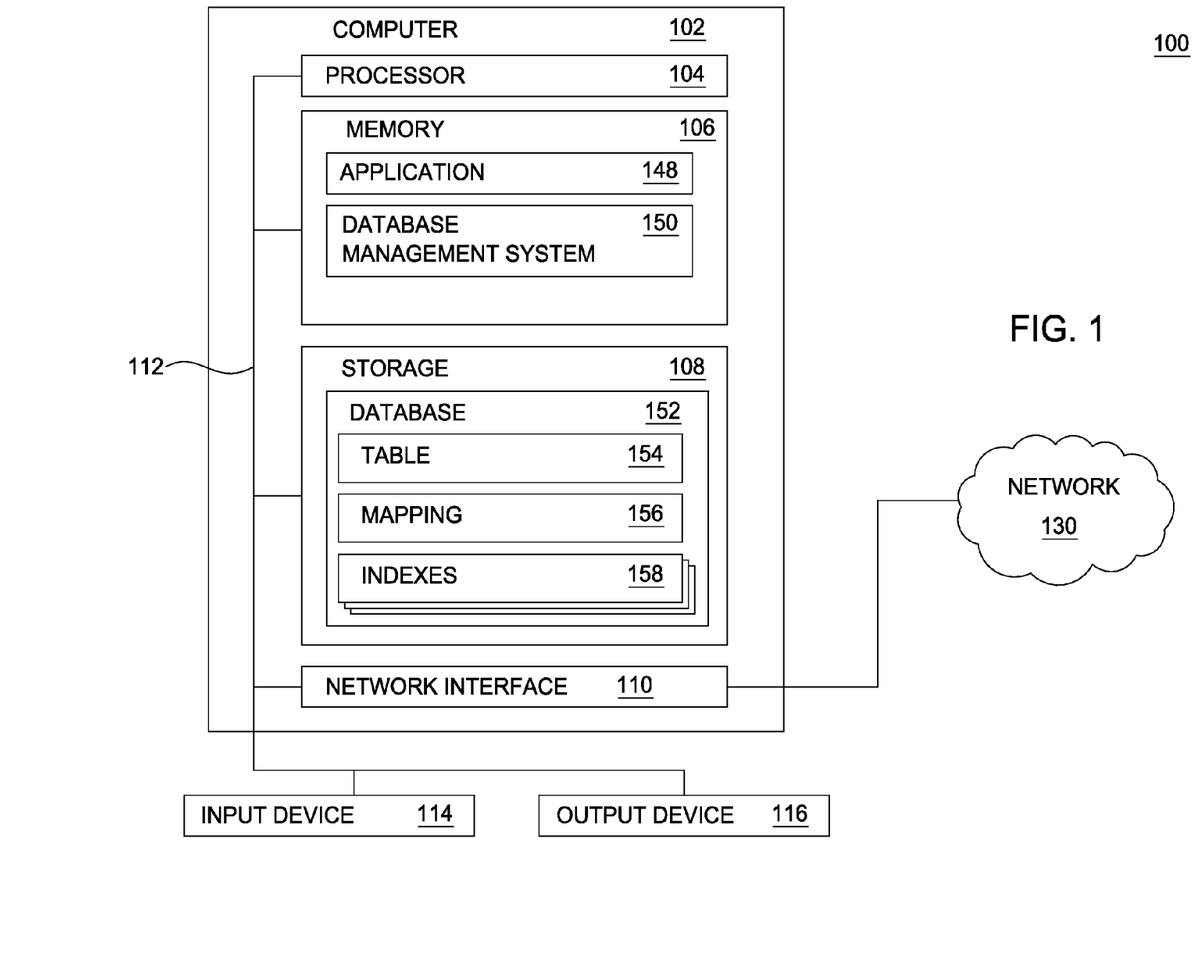
FIG. 1 is a block diagram illustrating a system for reorganizing a database table, according to one embodiment of the invention.

FIG. 1 is a block diagram illustrating a system 100 for reorganizing a database table, according to one embodiment of the invention. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes a database management system (DBMS) 150 configured to manage a database 152 stored in the storage 108 of the computer 102. The memory 106 of the computer 102 also includes an application 148 accessing the database 152 via the DBMS 150. In other embodiments, the application 148 executes on a different computer that communicates with the computer 102 via the network 130. The database 152 includes a database table 154, one or more database indexes 158 generated on the database table 152, and a mapping 156 that assigns a logical identifier to the row identifier of each row in the database table 154. Further, although embodiments are described herein with reference to a DBMS 150 configured o reorganize the database table 154, in other embodiments, some or all of the functionality of the DBMS 150 may be performed by the application 148. In some embodiments, the application 148 may be configured to access the database 152 directly and not via the DBMS 150.

Figure 2:
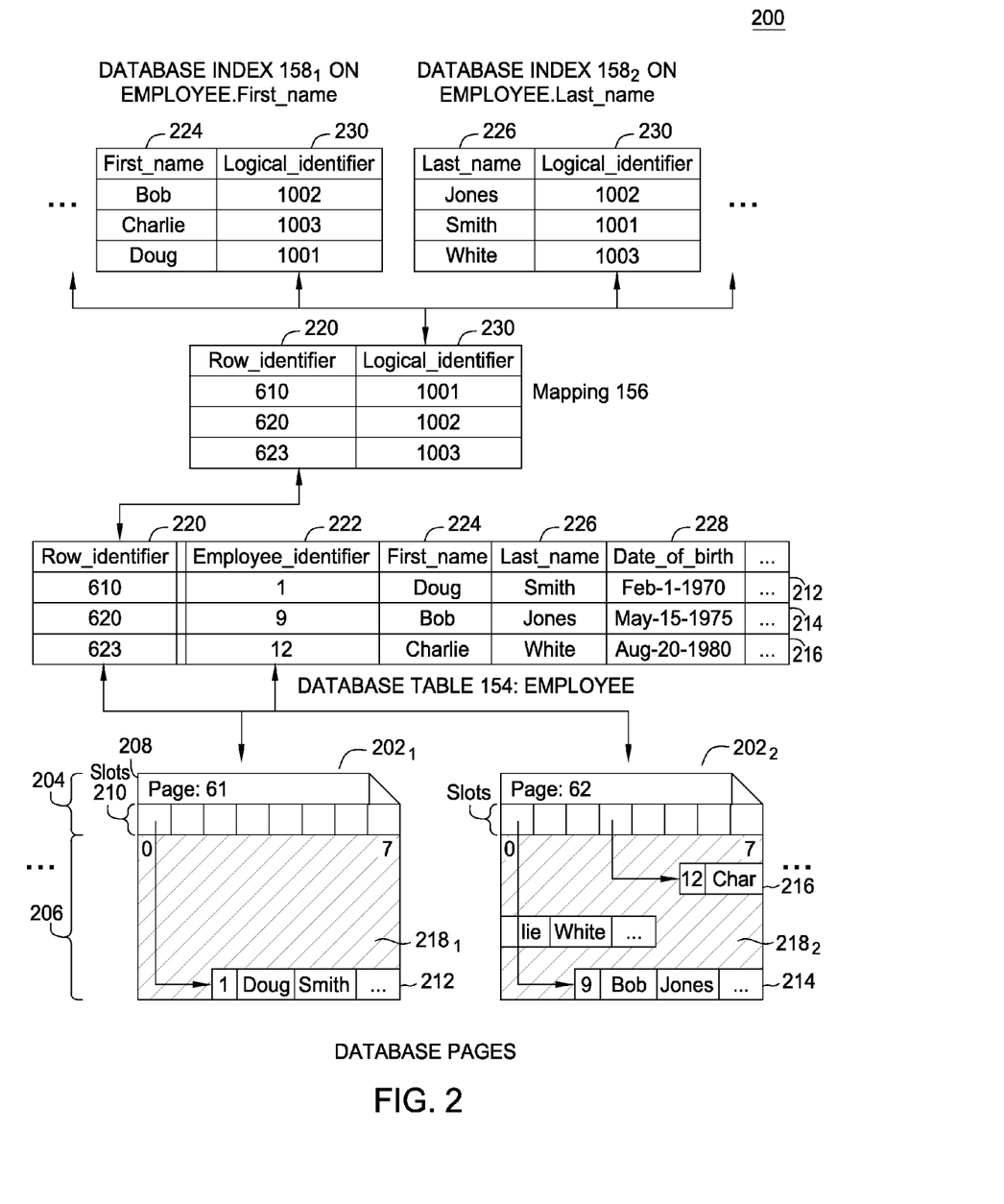
FIG. 2 illustrates a view of the database prior to reorganization, according to one embodiment of the invention.

FIG. 2 illustrates a view 200 of the database 152 prior to reorganization, according to one embodiment of the invention. Assume that the database table 154 is named as the EMPLOYEE table and stores data for employees of an organization. As shown, the database table 154 includes the following columns: employee identifier 222, first name 224, last name 226, and date of birth 228. In some embodiments, the DBMS 150 assigns a unique row identifier 220 to each row of data stored in the database table 152—independent of any column of the database table 154 that may be designated as a key or primary key for the database table 154. For example, even if a schema for the database table 154 specifies that the employee identifier 222 is a primary key for the database table 154, the DBMS 150 may nevertheless assign a unique row identifier 220 for to each row of data stored in the database table 152. As such, the row identifier 220 may be regarded as a system-defined column rather than a user-defined column. Depending on the embodiment, the DBMS 150 may be configured to expose or refrain from exposing the row identifier 220 to the application 148.

In one embodiment, rows in the database table 154 are stored in the storage 108 in the form of database pages 202. Each database page is of a predefined size that may be configured by an administrative user. Examples of the predefined size include four, eight, sixteen, or thirty-two kilobytes. Further, each database page 202 includes a header portion 204 and a data portion 206. The header portion 204 includes a page number 208 for the respective database page 202. The header portion 204 also includes multiple slots 210, each slot 210 storing a pointer to a row stored in the database page 202. The pointer may specify a physical address of the row in the database page 202. The data portion 206 stores multiple rows of data of the database table 154. As shown, the multiple rows of data include a first row 212 representing Doug Smith, who has an employee identifier of "1", a date of birth of Feb. 1, 1970, and a row identifier of "610". The multiple rows of data also include a second row 214 representing Bob Jones, who has an employee identifier of "9", a date of birth of May 15, 1975, and a row identifier of "620". The multiple rows of data further include a third row 216 representing Charlie White, who has an employee identifier of "12", a date of birth of Aug. 20, 1980, and a row identifier of "623".

In one embodiment, the row identifier 220 for each row contains a page number and a slot number. The page number specifies which database page 202 that the respective row is stored in. The slot number specifies which slot in the database page 202 stores a pointer to the row in the database page 202. The page number and the slot number may each occupy a respective, predefined count of bytes of the row identifier 220. For example, if the row identifier 220 is four bytes in size, then the page number may be three bytes in size and the slot number may be one byte in size. Of course, the respective sizes of the row identifier, the page number, and/or the slot number may be tailored to suit the needs of a particular case.

For clarity, each database page in FIG. 2 is assumed to have eight slots. In this particular example, the least significant digit of the row identifier is the slot number, and the remaining digits of the row identifier is the page number. For example, if the row identifier of a row is "623", then the row identifier specifies that a physical location of the row in the database may be given by a pointer stored in slot three of the database page sixty-two in the database. Accordingly, the physical location of the row representing Charlie White is given by a pointer stored in slot three of the database page $202_2$. Similarly, the physical location of the row representing Bob Jones is given by a pointer stored in slot zero of the database page $202_2$. Further, the physical location of the row representing Doug Smith is given by a pointer stored in slot zero of the database page $202_1$.

In one embodiment, the DBMS 150 assigns a distinct logical identifier 230 to the row identifier 220 of each row in the database table 154. The assignments may be stored in the form of a mapping 156 between logical identifiers 230 and row identifiers 220. In this particular example, the DBMS 150 assigns a logical identifier of "1001" to the row identifier of "610". The DBMS 150 also assigns a logical identifier of "1002" to the row identifier of "620". The DBMS 150 further assigns a logical identifier of "1003" to the row identifier of "623". In one embodiment, the DBMS 150 creates a mapping 154 that is specific to a particular database table 154. In other embodiments, the mapping 154 may store assignments for multiple database tables of the database 152.

In one embodiment, after the mapping 156 is created for the database table 154, the DBMS 150 generates one or more database indexes 158 for the database table 154. In this particular example, the DBMS 150 generates a first database index $158_1$ on the column representing first name 224 in the database table 154. The DBMS 150 also generates a second database index $158_2$ on the column representing last name 226 in the database table 154. Further, the DBMS 150 may be configured to generate each database index 158 based on the logical identifier 230 rather than the row identifier 220. As shown, the first database index $158_1$ is ordered by first name 224 and stores a respective logical identifier 230 for each first name 224. The second database index $158_2$ is ordered by last name 226 and stores a respective logical identifier 230 for each last name 226. Because the database indexes 158 store the logical identifier 230 rather than the row identifier 220, in order to access data in the database table 154, the DBMS 150 first uses the logical identifier 230 to retrieve a corresponding row identifier 220 from the mapping 156. The DBMS 150 then uses the row identifier 220 to retrieve data stored in the database pages 202.

As described above, in one embodiment, the database table 154 may be sparse as a result of insert, update, and/or delete operations on the database table 154 over time. A sparse database table is characterized by unused space 218 between rows in the database table, the unused space 218 resulting from the insert, update, and/or delete operations. For example, while database pages are often configured to store multiple rows of data, the database page $202_1$ is shown to only contain a single row representing Doug Smith. In one embodiment, the unused space 218 may be freed by reorganizing the database table 154. Reorganizing the database table 154 includes compacting rows to the beginning of the database table 154 and modifying the database table 154 and/or the mapping 156 to reflect changes in row identifiers of the compacted rows. Further, reorganizing the database table 154 may be initiated in response to a user request or triggered by the DBMS 150 upon detecting that a predefined condition is met.

In one embodiment, the DBMS 150 may receive the user request via a client application that is provided by or separate from the DBMS 150. The predefined condition may include the database table exceeding a predefined threshold of sparseness. The sparseness of the database table may be measured based on a count of rows in the database table, a count of columns in the database table, a row size associated with the database table, a column size associated with the database table, a count of insertions performed on the database table, a count of updates performed on the database table, a count of deletions performed on the database table, and/or a size occupied by the database table, etc.

Figure 3:
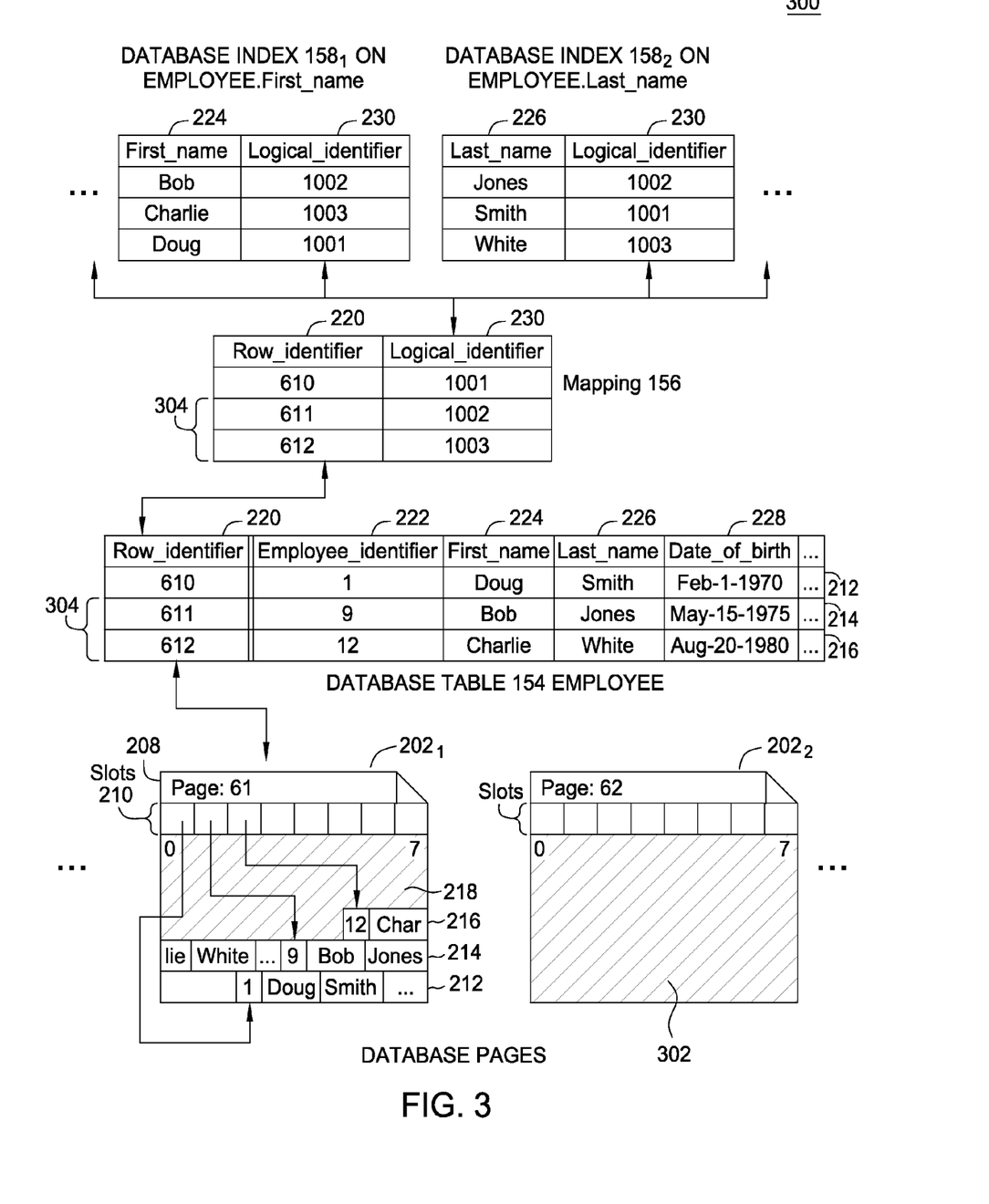
FIG. 3 illustrates a view of the database subsequent to reorganization, according to one embodiment of the invention.

FIG. 3 illustrates a view 300 of the database 152 subsequent to reorganization, according to one embodiment of the invention. In one embodiment, the DBMS 150 moves rows of the database table 154 to the beginning of the database table 154. In doing so, the DBMS 150 may store the database table 154 in a reduced number of database pages 202, relative to the database table 154 before reorganization. For example, the DBMS 150 moves the second row 214 and the third row 216 from the database page $202_2$ to the database page $202_1$, such that the rows 212, 214, 216 are stored contiguously across one or more database pages.

In one embodiment, while reorganizing the database table 154, the DBMS 150 may also update row identifiers in the database table 154 and/or the mapping 156. In some embodiments, however, the row identifier is not stored as part of the rows of the database table 154, and the DBMS 150 only updates row identifiers in the mapping 156. In this particular example, the mapping 156 includes updated row identifiers 304. Specifically, the row identifier of the second row 214 changes from "620" to "611", to reflect a new physical location of the second row 214, as given by the pointer stored in slot one of database page sixty-one. Similarly, the row identifier of the third row 216 changes from "623" to "612", to reflect a new physical location of the third row 216, as given by the pointer stored in slot three of database page sixty-one. Further, because the physical location of the first row 212 remains the same, the row identifier for the first row 212 remains as "610".

As a result of reorganizing the database table 154, the count of database pages 202 used to store the database table 154 is reduced from two to one. The database page $202_2$, which data portion is completely unused, may be used to store data for other database tables in the database 152. Alternatively, the database page 202 may be removed so as to free the associated space for use by the DBMS 150 or by other applications executing on the computer 102.

Further, the database table 154 is reorganized without requiring any of the database indexes 158 to be modified or rebuilt. Because the database indexes 158 identify rows using the logical identifier 230 rather than the row identifier 220, the DBMS 150 only modifies the mapping 156 when reorganizing the database table 154. Further, reorganizing the database table 154 no longer requires exclusive access to the database table. And although configuring the database 152 to use logical identifiers 230 may introduce a slight overhead when accessing data in the database 152, the slight overhead may be outweighed by an improvement in performance from not having to regenerate the database indexes 158 each time the database table 154 is reorganized. Advantageously, the database table 154 may be reorganized more efficiently, especially in cases where a significant number of databases indexes 158 have been generated on the database table 154. In particular, a database table may often contain hundreds of millions of rows and be associated with several dozen database indexes. In such cases, it can be very time consuming to regenerate the database indexes. For instance, regenerating the database indexes may require many hours of exclusive access to the database table.

Figure 4:
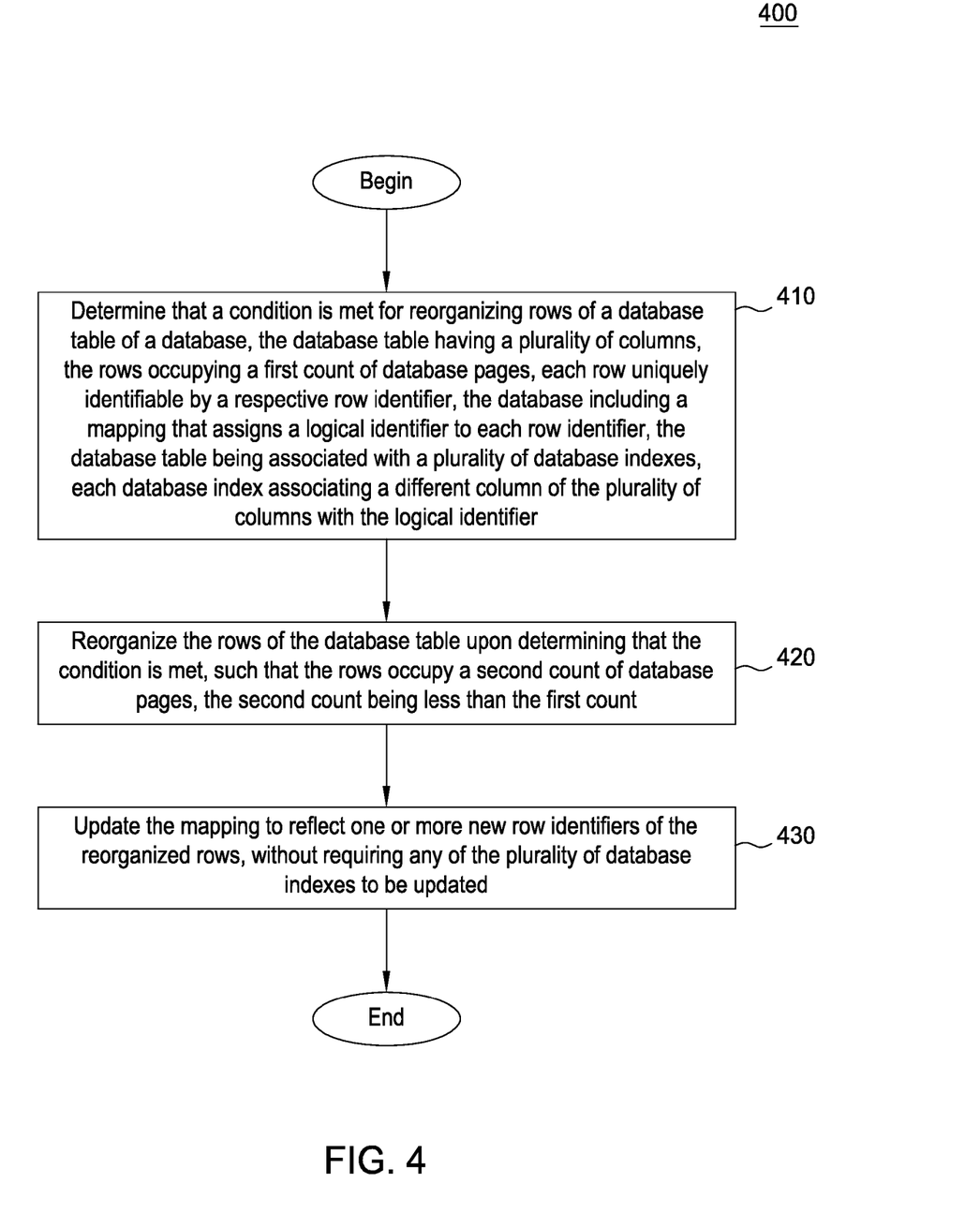
FIG. 4 is a flowchart depicting a method for reorganizing a database table without modifying database indexes on the database table, according to one embodiment of the invention.

FIG. 4 is a flowchart depicting a method 400 for reorganizing a database table without modifying database indexes on the database table, according to one embodiment of the invention. As shown, the method 400 begins at step 410, where the DBMS 150 determines that a condition is met for reorganizing rows of a database table of a database. The database table has multiple columns, and the rows occupy a first count of database pages. Each row is uniquely identified by a respective row identifier. The database includes a mapping that assigns a logical identifier to each row identifier. The database table is associated with multiple database indexes. Each database index associates a different column of the database table with the logical identifier.

At step 420, the DBMS 150 reorganizes the rows of the database table upon determining that the condition is met, such that the rows occupy a second count of database pages, the second count being less than the first count. For example, the DBMS 150 may move the rows 214, 216 from the database page $202_2$ to the database page $202_1$ in FIG. 3. At step 430, the DBMS 150 updates the mapping to reflect one or more new row identifiers of the reorganized rows, without requiring any of the database indexes to be updated. As used herein, updating a database index refers to modifying and/or rebuilding the database index. For example, the DBMS 150 may update the mapping 156 of FIG. 3 to include the updated row identifiers 304. After the step 430, the method 400 terminates.

Figure 5:
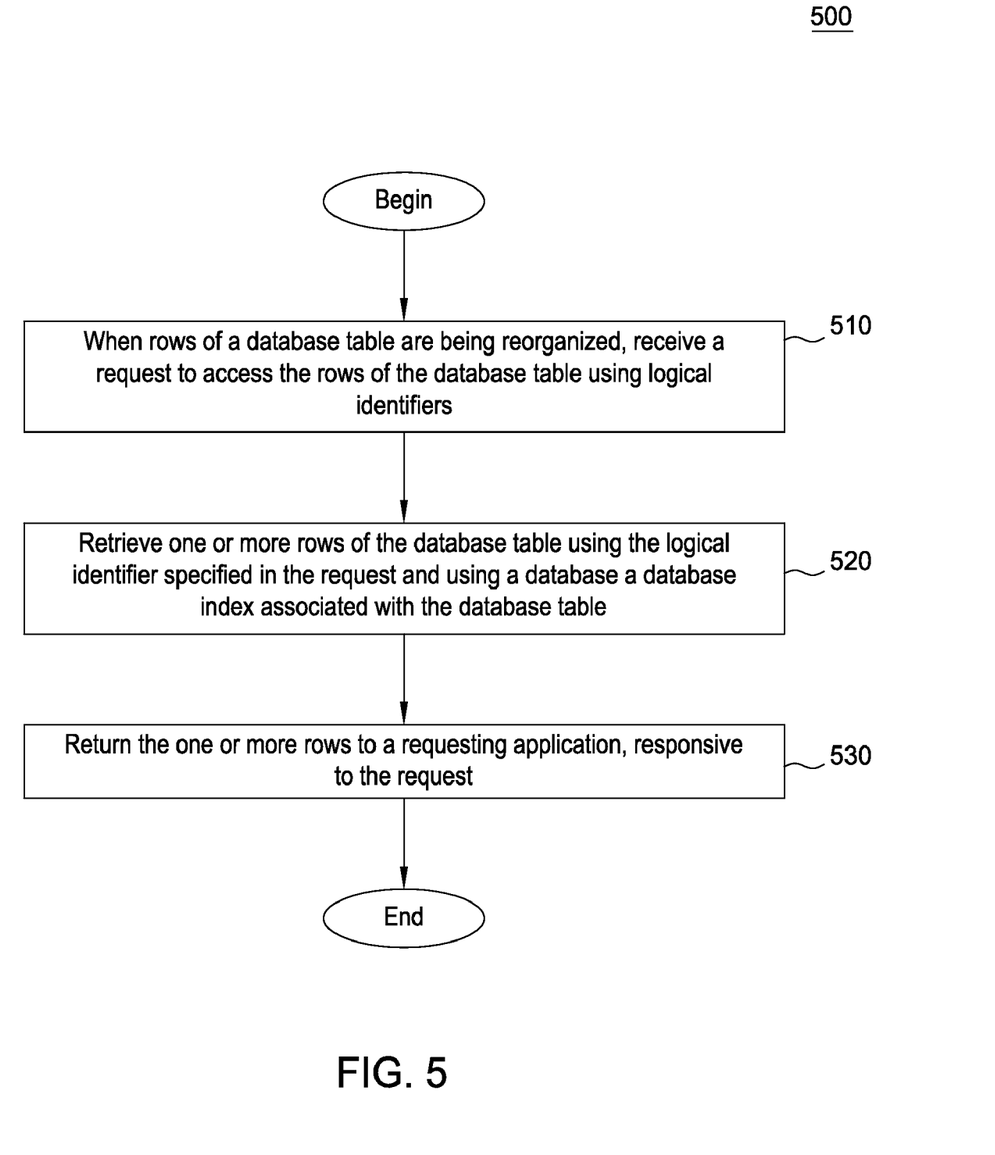
FIG. 5 is a flowchart depicting a method for reorganizing a database table without requiring exclusive access to the database table, according to one embodiment of the invention.

FIG. 5 is a flowchart depicting a method 500 for reorganizing a database table without requiring exclusive access to the database table, according to one embodiment of the invention. As shown, the method 500 begins at step 510, where the DBMS 150 receives, from an application, a request to access rows of the database table using one or more logical identifiers. The request may be received when the DBMS 150 is reorganizing the database table. At step 520, the DMBS 150 retrieves one or more rows of the database table using the logical identifier specified in the request and using a database index associated with the database table. Because the database indexes do not need to be rebuilt and because only the logical identifier and not the physical identifier is exposed to the application by the DBMS 150, the one or more rows may be retrieved even when the DBMS 150 is reorganizing the database table. At step 530, the DBMS 150 returns the one or more rows to the application, responsive to the request. At step 540, the method 500 terminates.

Figure 6:
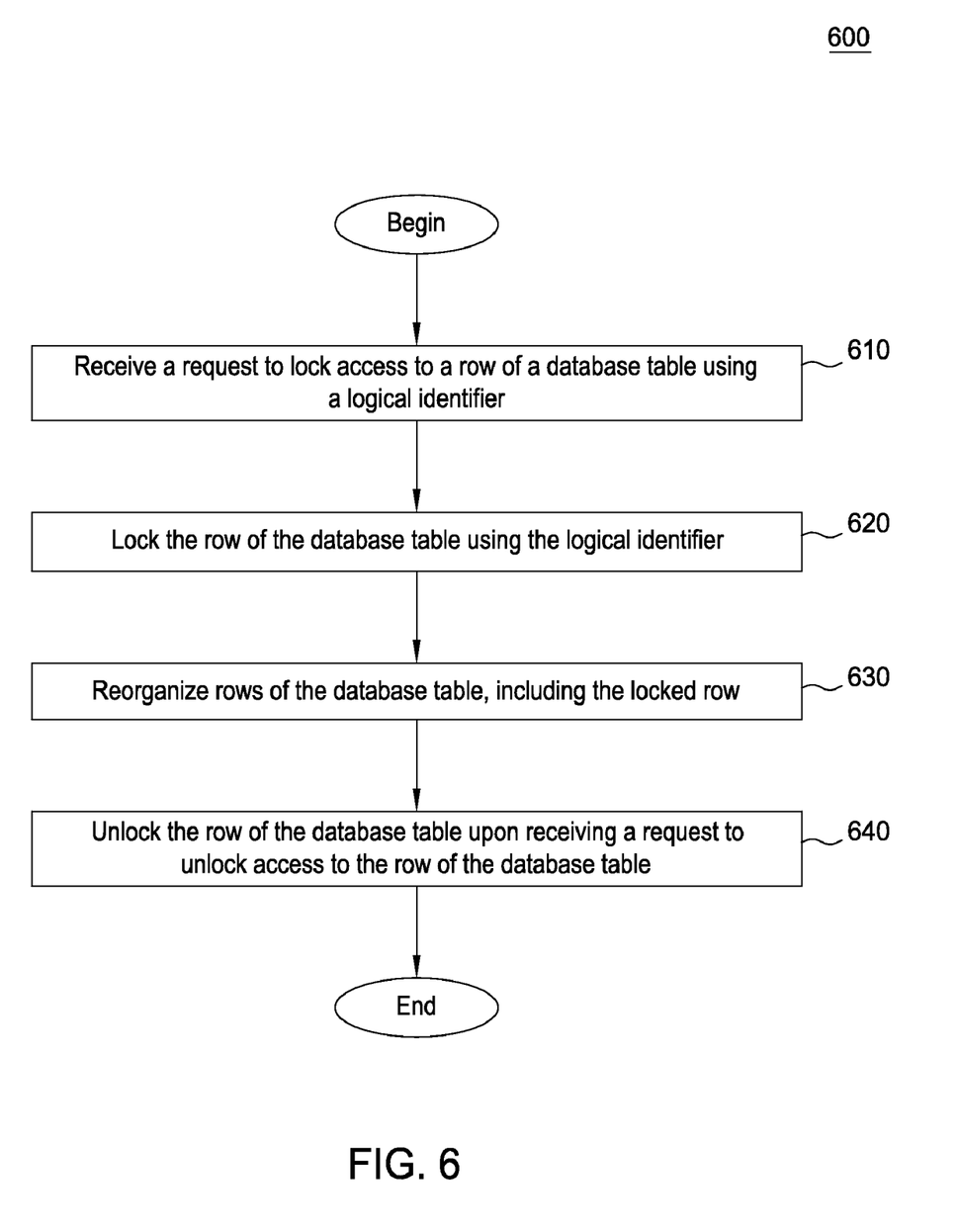
FIG. 6 is a flowchart depicting a method for reorganizing a database table when one or more rows of the database table are locked, according to one embodiment of the invention.

FIG. 6 is a flowchart depicting a method 600 for reorganizing a database table when one or more rows of the database table are locked, according to one embodiment of the invention. As shown, the method 600 begins at step 610, where the DBMS 150 receives, from an application, a request to lock access to a row of a database table, where the request specifies a logical identifier for the row. At step 620, the DBMS 150 locks the row of the database table using the logical identifier. In other words, the DBMS 150 implements a row locking protocol based on logical identifiers rather than row identifiers. At step 630, the DBMS 150 reorganizes rows of the database table, including the locked row. Because the database indexes do not need to be rebuilt and because only the logical identifier and not the physical identifier is exposed to the application by the DBMS 150, the database table may be reorganized even when the row is locked. At step 640, subsequent to reorganizing the rows of the database table, the DBMS 150 unlocks the row upon receiving a request to unlock access to the row of the database table. After the step 640, the method 600 terminates.

Advantageously, embodiments of the invention provide techniques for reorganizing database tables. One embodiment of the invention provides a DBMS that is configured to assign both row identifiers and logical identifiers to each row of data stored in a database table of a database. The DBMS is further configured to generate database indexes for the database table based on the logical identifiers and not the row identifiers. The DBMS is further configured to reorganize the database table without requiring any database indexes to be modified or rebuilt. The database table may also be reorganized without requiring exclusive access to the database table. Accordingly, performance of the DBMS and/or the database may be improved at least in some cases.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   determining that a condition is met for reorganizing rows of a database table of a database, the database table having a plurality of columns, the rows occupying a first count of database pages, each row uniquely identifiable by a respective row identifier, the database including a mapping that assigns a logical identifier to each row identifier, the database table being associated with a plurality of database indexes, each database index associating a different column of the plurality of columns with the logical identifier;
   upon determining that the condition is met, reorganizing the rows of the database table by operation of one or more computer processors, such that the rows occupy a second count of database pages, the second count being less than the first count; and updating the mapping to reflect one or more new row identifiers of the reorganized rows, without requiring any of the plurality of databases indexes to be updated.

2. The computer-implemented method of claim 1, wherein the condition comprises receiving a request to reorganize the rows of the database table.

3. The computer-implemented method of claim 1, wherein each row identifier specifies a respective database page number and slot number.

4. The computer-implemented method of claim 1, further comprising:

journaling each update to the mapping such that the plurality of database indexes need not be updated even in an event of a system crash.

5. The computer-implemented method of claim 1, wherein the rows of the database table are reorganized concurrently with one or more applications using logical identifiers to access the rows of the database table.

6. The computer-implemented method of claim 1, wherein the rows of the database table are reorganized even in an event of an application using a logical identifier to lock access to one of the rows of the database table.

7. The computer-implemented method of claim 1, further comprising:

generating the mapping by assigning a logical identifier for each row identifier of the database table.

8. A computer program product, comprising:

a non-transitory computer-readable storage medium having computer-readable program code embodied therewith, the computer-readable program code comprising:

computer-readable program code configured to determine that a condition is met for reorganizing rows of a database table of a database, the database table having a plurality of columns, the rows occupying a first count of database pages, each row uniquely identifiable by a respective row identifier, the database including a mapping that assigns a logical identifier to each row identifier, the database table being associated with a plurality of database indexes, each database index associating a different column of the plurality of columns with the logical identifier;

computer-readable program code configured to, upon determining that the condition is met, reorganize the rows of the database table such that the rows occupy a second count of database pages, the second count being less than the first count; and computer-readable program code configured to update the mapping to reflect one or more new row identifiers of the reorganized rows, without requiring any of the plurality of databases indexes to be updated.

9. The computer program product of claim 8, wherein the condition comprises receiving a request to reorganize the rows of the database table.

10. The computer program product of claim 8, wherein each row identifier specifies a respective database page number and slot number.

11. The computer program product of claim 8, wherein the computer-readable program code further comprises:

computer-readable program code configured to journal each update to the mapping such that the plurality of database indexes need not be updated even in an event of a system crash.

12. The computer program product of claim 8, wherein the rows of the database table are reorganized concurrently with one or more applications using logical identifiers to access the rows of the database table.

13. The computer program product of claim 8, wherein the rows of the database table are reorganized even in an event of an application using a logical identifier to lock access to one of the rows of the database table.

14. The computer program product of claim 8, wherein the computer-readable program code further comprises:

computer-readable program code configured to generate the mapping by assigning a logical identifier for each row identifier of the database table.

15. A system, comprising:

one or more computer processors;

a memory containing a program, which when executed by the one or more computer processors is configured to perform an operation comprising:

determining that a condition is met for reorganizing rows of a database table of a database, the database table having a plurality of columns, the rows occupying a first count of database pages, each row uniquely identifiable by a respective row identifier, the database including a mapping that assigns a logical identifier to each row identifier, the database table being associated with a plurality of database indexes, each database index associating a different column of the plurality of columns with the logical identifier;

upon determining that the condition is met, reorganizing the rows of the database table such that the rows occupy a second count of database pages, the second count being less than the first count; and updating the mapping to reflect one or more new row identifiers of the reorganized rows, without requiring any of the plurality of databases indexes to be updated.

16. The system of claim 15, wherein the condition comprises receiving a request to reorganize the rows of the database table.

17. The system of claim 15, wherein each row identifier specifies a respective database page number and slot number.

18. The system of claim 15, wherein the operation further comprises:

journaling each update to the mapping such that the plurality of database indexes need not be updated even in an event of a system crash.

19. The system of claim 15, wherein the rows of the database table are reorganized concurrently with one or more applications using logical identifiers to access the rows of the database table.

20. The system of claim 15, wherein the rows of the database table are reorganized even in an event of an application using a logical identifier to lock access to one of the rows of the database table.

* * * * *